(12) United States Patent
Zaraphonitis

(10) Patent No.: US 12,092,077 B2
(45) Date of Patent: Sep. 17, 2024

(54) TRANSMISSION OF ENDLESS ROTATION TO A SHAFT ON AN ENDLESSLY ROTATING CARRIER INDEPENDENTLY OF THE ROTATION OF THE CARRIER

(71) Applicant: Panagiotis Zaraphonitis, Sparti Lakonias (GR)

(72) Inventor: Panagiotis Zaraphonitis, Sparti Lakonias (GR)

( * ) Notice: Subject to any disclaimer, the term of this patent is extended or adjusted under 35 U.S.C. 154(b) by 49 days.

(21) Appl. No.: 18/011,955

(22) PCT Filed: Jun. 23, 2021

(86) PCT No.: PCT/GR2021/000039
§ 371 (c)(1),
(2) Date: Dec. 21, 2022

(87) PCT Pub. No.: WO2021/260400
PCT Pub. Date: Dec. 30, 2021

(65) Prior Publication Data
US 2023/0167805 A1 Jun. 1, 2023

(30) Foreign Application Priority Data
Jun. 23, 2020 (GR) .............................. 20200100357

(51) Int. Cl.
*F03D 15/00* (2016.01)
*F16H 1/28* (2006.01)

(52) U.S. Cl.
CPC .......... *F03D 15/00* (2016.05); *F16H 1/2854* (2013.01); *F05B 2260/4031* (2013.01); *F16H 2001/2881* (2013.01)

(58) Field of Classification Search
CPC .......... F03D 15/00; F16H 1/2854; F16H 1/28; F16H 2001/2881; F16H 57/082;
(Continued)

(56) References Cited

U.S. PATENT DOCUMENTS 3,453,907 A * 7/1969 Noguchi .................. F16H 1/46
475/341
4,954,123 A * 9/1990 Kurywczak .............. F16H 1/46
475/179
(Continued)

FOREIGN PATENT DOCUMENTS

DE 10 2017 207787 A1 11/2018
EP 2 594 819 A1 5/2013
(Continued)

*Primary Examiner* — Brian Christopher Delrue
*Assistant Examiner* — Joshua R Beebe
(74) *Attorney, Agent, or Firm* — DP IP GROUP; Franco S. De Liguori

(57) ABSTRACT

A compound planetary mechanism includes a frame, a first carrier for undergoing rotation about a central axis of rotation of the first carrier, a first gear, a second gear for undergoing rotation about the central axis of rotation, and at least one planetary mechanism having a second carrier supported on the first carrier for undergoing rotation about a planetary axis and disposed substantially parallel to and a distance from the central axis of rotation. The second carrier includes a first shaft supported on the second carrier for undergoing rotation about a satellite axis forming an angle between zero and ninety degrees with the planetary axis, a third gear connected to a first end of the first shaft coaxially with the satellite axis, and a fourth gear connected to a second end of the first shaft coaxially with the satellite axis. The mechanism further includes a second shaft configured to rotate freely and endlessly about the planetary axis, a fifth gear connected to a first end of the second shaft coaxially with the planetary axis and cooperating with the first gear, a sixth gear connected to a second end of the second shaft coaxially with the planetary axis and cooperating with the third gear, a third shaft supported on the second carrier and configured to rotate freely and endlessly about the planetary axis, a seventh gear connected to a first end of the third shaft
(Continued)

SECTION A-A coaxially with the planetary axis and cooperating with the fourth gear, and an eighth gear cooperating with the second gear and connected coaxially with the planetary axis either to a second end of the third shaft or to the second carrier.

18 Claims, 10 Drawing Sheets

(58) Field of Classification Search
CPC ... F16H 57/08; F16H 1/36; F16H 3/46; F16H 3/56; F05B 2260/4031
See application file for complete search history.

(56) References Cited

U.S. PATENT DOCUMENTS

| | | | |
|---|---|---|---|
| 6,481,553 B1* | 11/2002 | Lee | F16H 57/08 |
| | | | 475/346 |
| 11,940,034 B2* | 3/2024 | Zaraphonitis | F16H 1/28 |
| 2010/0120573 A1* | 5/2010 | Benito | F03D 15/00 |
| | | | 475/331 |
| 2012/0134805 A1* | 5/2012 | Nies | F03D 80/70 |
| | | | 416/1 |
| 2015/0240790 A1* | 8/2015 | Witzig | F03D 15/00 |
| | | | 475/248 |
| 2018/0209512 A1* | 7/2018 | Klein-Hitpass | F16H 3/64 |
| 2022/0397096 A1* | 12/2022 | De Vries | F03D 15/00 |

FOREIGN PATENT DOCUMENTS

| | | |
|---|---|---|
| RU | 2 677 952 C1 | 1/2019 |
| WO | WO-2016016645 A2 * | 2/2016 |

* cited by examiner

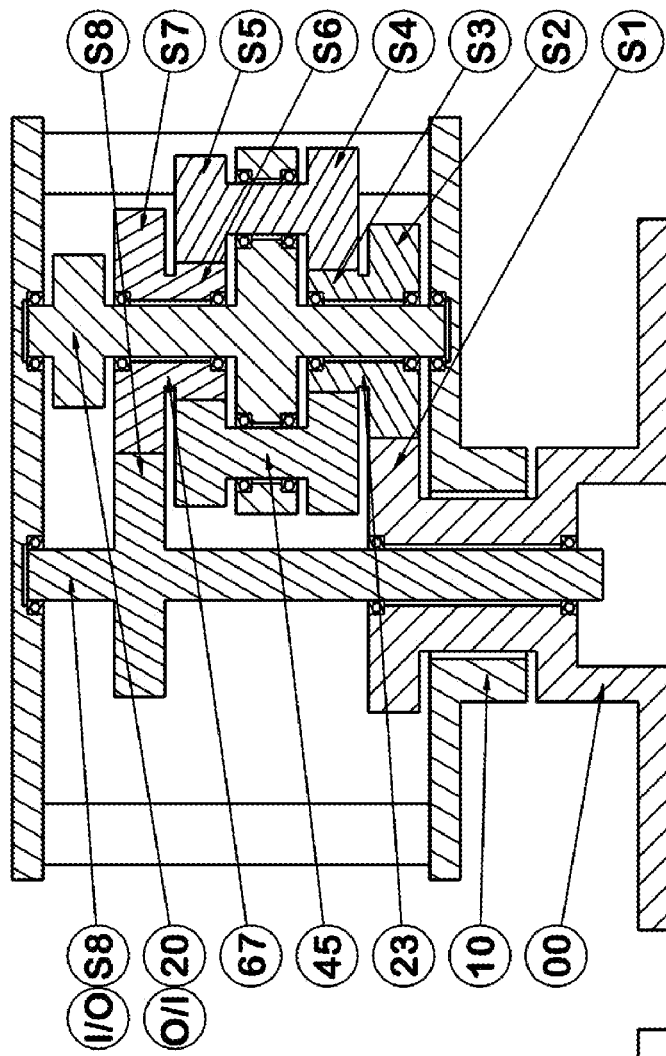
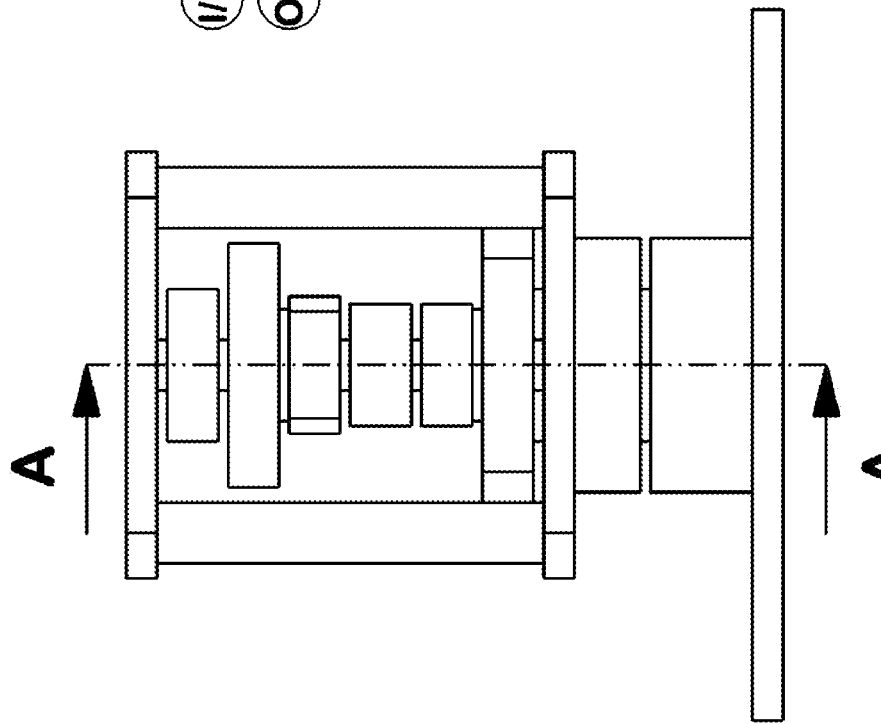
SECTION A-A
Fig. 01B
Fig. 01A

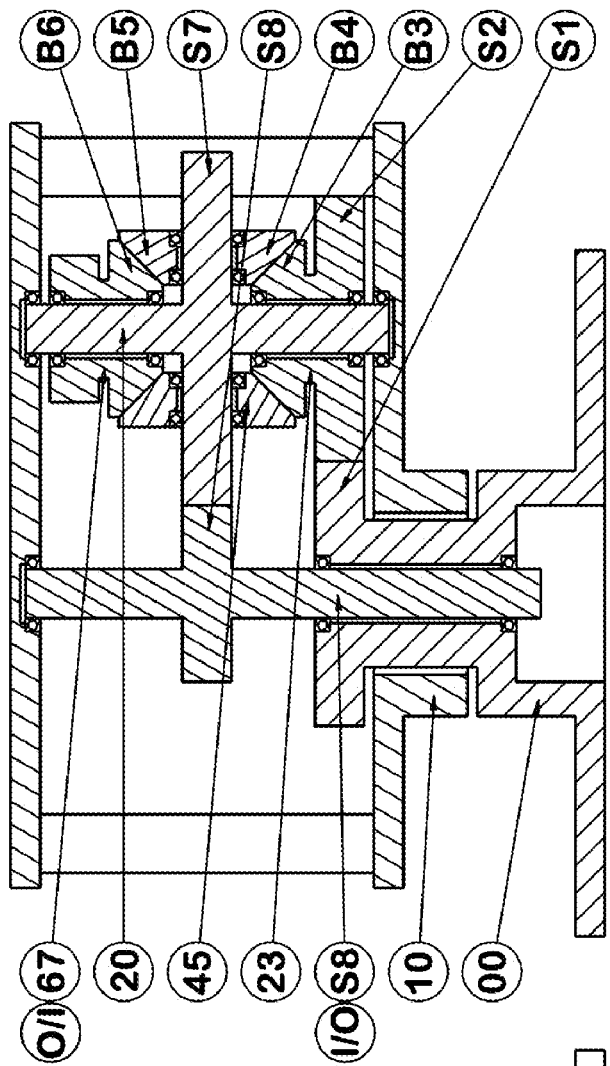
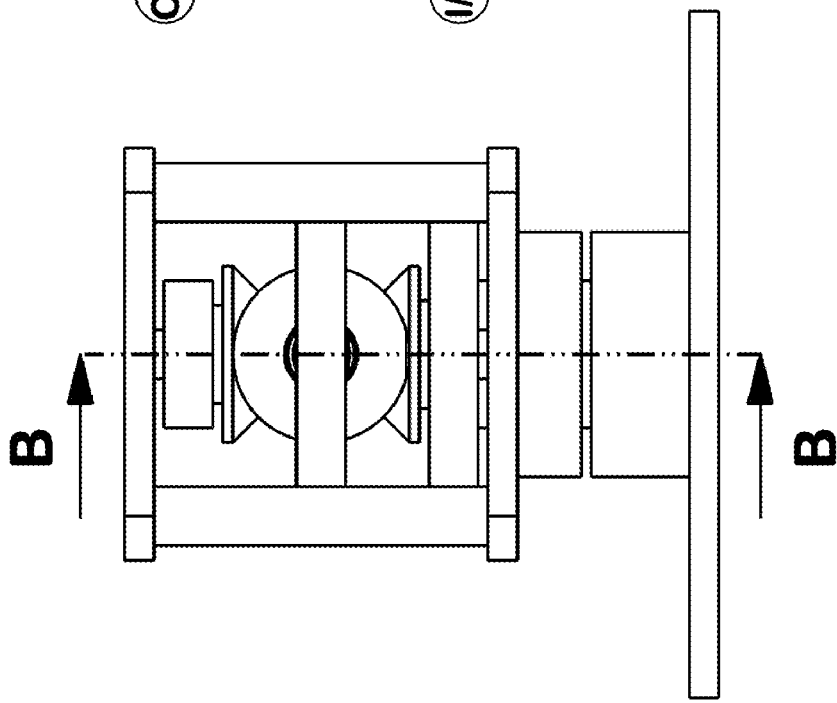
Fig. 02B
SECTION B-B
Fig. 02A

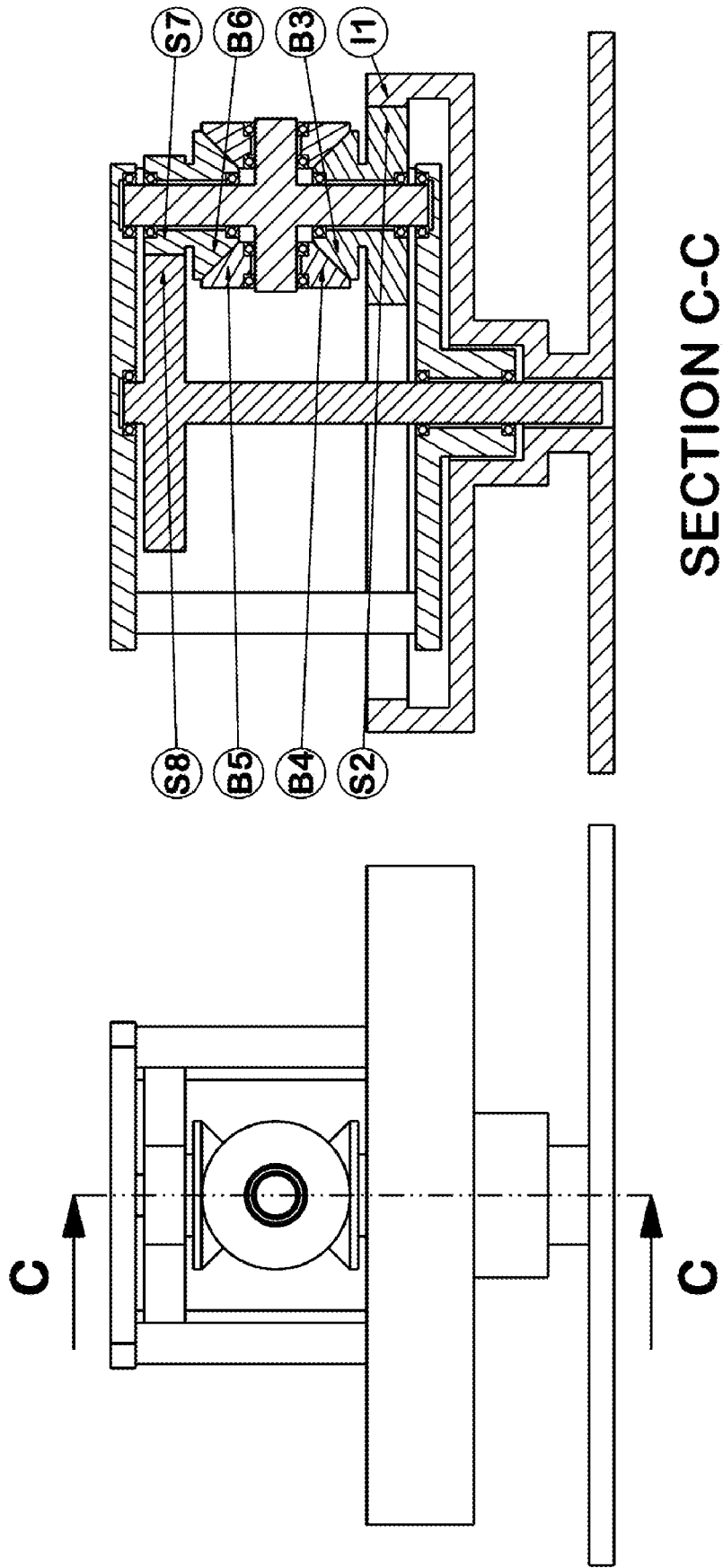

TRANSMISSION OF ENDLESS ROTATION TO A SHAFT ON AN ENDLESSLY ROTATING CARRIER INDEPENDENTLY OF THE ROTATION OF THE CARRIER

RELATED APPLICATIONS

This application is a national stage application under 35 U.S.C. 371 of PCT/GR2021/000039, filed Jun. 23, 2021, which claims the benefit of Greek Patent Appln. No. 20200100357, filed Jun. 23, 2020.

BACKGROUND

Field

The present invention refers to a purely mechanical mechanism which transmits endless rotation from a driving shaft on a stationary frame to a driven shaft on an endlessly rotating carrier, or vice versa, independently of the rotation of the carrier.

Background Information

In many applications, specific or not, there is the need to transmit endless rotation from a driving shaft on a stationary frame to a driven shaft on a rotating carrier, or vice versa, without the endless rotation of the carrier affecting this transmission.

Such an example is the horizontal axis wind turbine, the horizontal propeller shaft of which rests on a carrier, named "nacelle", which rotates about a vertical axis, and therefore any conventional way of transmission from the horizontal axis to a vertical axis on a frame which is stationary with respect to the ground, results in the prohibitive presence—to some extent—of the angular velocity of the nacelle in the finally produced angular velocity of the last element of this power-train.

This, of course, at the same time results in the presence of a torque on the nacelle, which is directly related to the transmitted torque of the propeller shaft; it is necessary to impose a torque on the nacelle in order to be always oriented at its optimal operating position for work production, but this orientation torque must have nothing to do with the transmitted torque from the propeller shaft to the stationary frame.

Other examples are the transmission of rotation between the chassis of a large excavator or a battle tank and their endlessly rotating turret, or between the chassis of a vehicle and its drive wheel which is supported on a—possibly endlessly—rotating steering bracket.

Another such example is the propeller pitch adjustment mechanism for a propeller-driven aircraft, a helicopter, a propeller-driven craft or a wind turbine, as well, although the existing mechanisms for these applications have satisfactory performance, as the required motion is finite and not endless.

There are, however, many other examples that require an independent endless rotational transmission to a shaft on an endlessly rotating carrier.

The aim, therefore, is to design a purely mechanical mechanism that performs a transmission of endless rotation from a driving shaft on a stationary frame to a driven shaft on an endlessly rotating carrier, or vice versa, independently of the rotation of the carrier, with the least possible number of moving parts and the highest possible degree of efficiency.

The most known—and the most explanatory, at the same time—way of transmitting motion, in general, using purely mechanical means, to an element on an endlessly rotating carrier, independently of the rotation of the carrier, is the way to adjust the propeller pitch in a helicopter:

on the frame of the helicopter, the one end of a first rod moves linearly in a direction, resulting in moving, also linearly, the other end of this rod in a direction perpendicular to the previous one, while this direction coincides with the axis of rotation of the rotating propeller hub, and from this point, through axial thrust bearings, this motion is transmitted—independently of the endless rotation of the propeller hub with respect to the frame of the helicopter—at the one end of a second rod, the operation plane of which rigidly lays on the propeller hub, and in this way the other end of this rod finally performs the adjustment of the propeller pitch, independently of the endless rotation of the propeller hub with respect to the frame of the helicopter.

Therefore, if the first end of the first rod, of a similar mechanism, is driven by a crankshaft which rotates endlessly on the stationary frame of this mechanism, and the second end of the second rod drives another crankshaft which rotates endlessly on the also endlessly rotating carrier of this mechanism, a transmission of endless rotation from a driving shaft on a stationary frame to a driven shaft on an endlessly rotating carrier is achieved, independently of the rotation of the carrier.

However, the two conversions of endless rotary motion into reciprocating linear motion and vice versa, as well as the axial thrust, through the axial thrust bearings, are processes that require many moving parts in an inflexible and rather bulky arrangement and, of course, the overall degree of efficiency appears significantly low, while, in addition, there are problematic points—usually named "dead centers"—of instant indeterminacy of the direction of motion during the conversion of reciprocating linear motion into endless rotary motion.

Such a technique is described—in fact it is applied to a wind turbine—in the patent application TWI572779.

In the patent applications ES2273609 and CN102691629 there are attempts to transmit rotation from the nacelle to the base of the tower, through bevel gears and two coaxial vertical shafts or one, respectively.

In the patent application JP3157729 a proposal for a nacelle rigidly connected to a rotating tower is shown.

As for other applications except the wind turbine ones, perhaps there is no any relative proposal, and patent applications such as DE202005016021 and CN105848836 stand far from the concept of the present invention and do not solve directly and effectively the problem of independent transmission with the aforementioned requirements.

So, except the above described way, it seems that there is no other similar proposal, in the prior state of the art, of achieving, via purely mechanical means only, the required transmission independently of the rotation of the carrier.

SUMMARY

In order to directly solve the aforementioned problems, using purely mechanical means, it is necessary to somehow remove the effects, kinematic and dynamic, of the endless rotation of the carrier on the transmitted rotation.

So, a Compound Planetary Mechanism is proposed, the planets of which belong to another Planetary Mechanism, which therefore may be named "Eccentric Planetary Mechanism", and this Compound Planetary Mechanism may be named "Epi-Planetary Mechanism", in a sense that this configuration is a Mechanism onto a Mechanism.

The Eccentric Planetary Mechanism can be any mechanical assembly with three ports, inputs or outputs, such as the classic differential mechanism of a vehicle, where the one input of this mechanism is the main rotation, which must be transferred, but mixed with the—in some way—undesired endless rotation of the carrier, with a positive sign, the other input is this undesired endless rotation of the carrier, with a negative sign, while its output is the filtered final endless rotation, directly related to the initial main rotation only.

The Compound Planetary Mechanism generally has a frame and a first carrier, which is the already existing one and rotates with the undesired endless rotation with respect to the frame, a first gear which is coaxial with the first carrier and rigidly connected to the frame, a second gear which is coaxial also with the first carrier and freely and endlessly rotates, constituting either the input or the output of the Compound Planetary Mechanism, and on the first carrier, eccentrically and preferably parallel to its axis, has also one—or more—Eccentric Planetary Mechanism.

Each Eccentric Planetary Mechanism, generally, has a second carrier, on which eccentrically and preferably parallel to its axis there is one—or more—axis, about which a first shaft rotates, with a third gear and a fourth gear rigidly connected to both ends of it, while on the one side of the second carrier, coaxially with it, freely and endlessly rotates a second shaft, with a fifth gear and a sixth gear rigidly connected to both ends of it, cooperating with the first gear and the third gear, respectively, and on the other side, also, of the second carrier, coaxially with it, freely and endlessly rotates a third shaft, with a seventh gear and an eighth gear rigidly connected to both ends of it, cooperating with the second gear and the fourth gear, respectively.

Depending on the design, either the second carrier or the third shaft constitutes either the output or the input of the Compound Planetary Mechanism, inversely depending on the role of the second gear.

The Compound Planetary Mechanism, as a whole, is designed so that the flow of the power, from its input to its output, is performed independently, kinematically and dynamically, of the rotation of the already existing carrier and for this purpose there is a mathematical relation between the teeth numbers of all the gears involved, which is proposed to be named: "Independence Condition".

Since it seems that this mechanism is a really new configuration solving several important problems, instead of its long name-description: "Mechanism for Transmission of Endless Rotation to a Shaft on an Endlessly Rotating Carrier Independently of the Rotation of the Carrier", it is proposed to be named "Eleuthero-Strophic Mechanism", which means an Independent Rotation Mechanism, or even "Eleuthero-Strophe", which means an Independently Rotating Hub; the term "Eleutheros" is already used in English language, in History, Anthropology and Botany, but not in Engineering, so there is no any possibility to be confused with another meaning, similar or not.

Finally, looking at this issue from a wider perspective, it should be noted that the Mechanism for Transmission of Endless Rotation to a Shaft on an Endlessly Rotating Carrier Independently of the Rotation of the Carrier or Eleuthero-Strophe, while radically differs (especially: in the present invention the amplitude of the involved oscillation is just zero) from the previous cases WO/2007/125373, WO/2009/040588, WO/2018/020279 and PCT/GR2021/000012 (where, also, the amplitude of the involved oscillation is just zero), falls within the broadly defined category under the name:

"DISTRIBUTIVE OSCILLATING TRANSMISSION" ("DOT").

BRIEF DESCRIPTION OF THE DRAWINGS

The drawings present:

FIG. 01A: a side view; and FIG. 01B: the meridian section along line A-A in FIG. 01A of a mechanism with spur gears exclusively.

FIG. 02A: a side view; and FIG. 02B: the meridian section along line B-B in FIG. 02A of a mechanism with spur and bevel gears.

FIG. 05A: a side view; and FIG. 05B: the meridian section along line C-C in FIG. 05A of a mechanism with spur and bevel gears, the reaction sun of which is an internal gear.

DETAILED DESCRIPTION

Technical Terms

Figure 4:
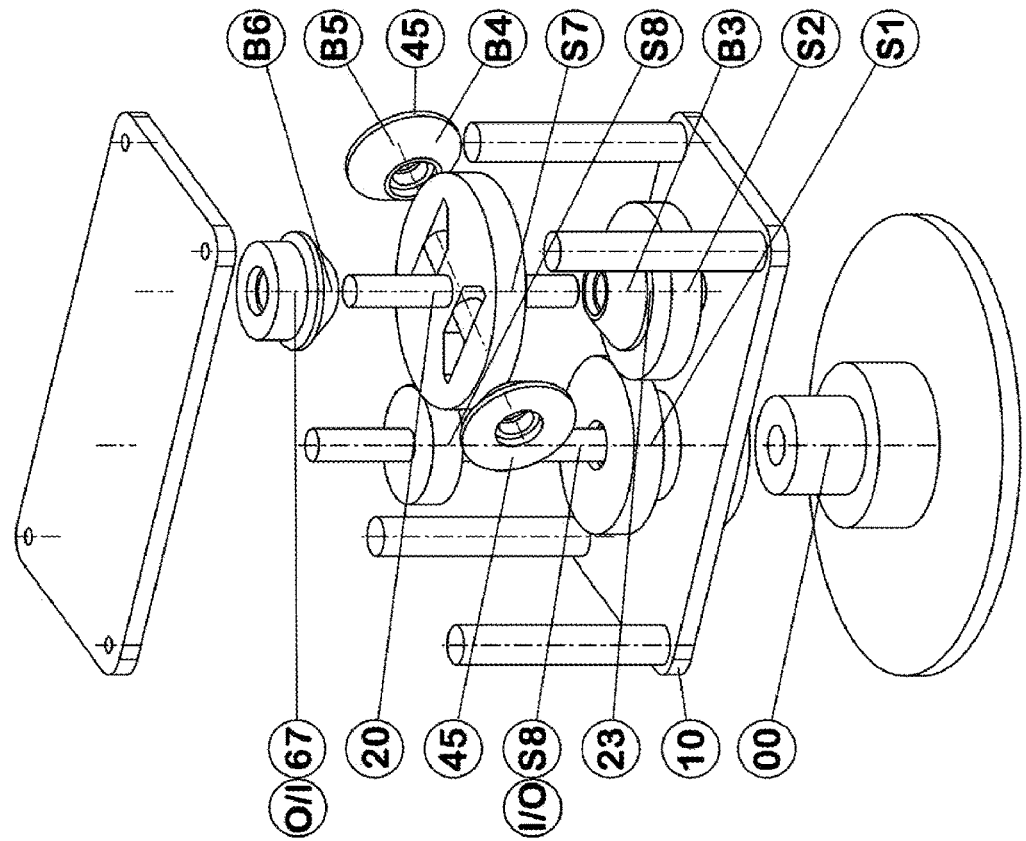
FIG. 04: an exploded oblique view of the same mechanism as in FIGS. 02A, 02B, where the planetary carrier, also, has been rotated at a random angle, in order to present clearly the satellites.

Frame, Carrier, Central Carrier, Planetary Carrier, Shaft, Planetary Shaft, Satellite Shaft, Sun, Planet, Sun-Planet, Satellite-Planet, Satellite, Gear, Spur Gear, Bevel Gear, External Gear, Internal Gear, Teeth Number, Rotation, Endless Rotation, Independent Rotation, "Independence Condition", Planetary Mechanism, "Epi-Planetary" Mechanism, Compound Planetary Mechanism, "Eleuthero-Strophic" Mechanism, "Eleuthero-Strophe".

Here is an exhaustive presentation of the Compound Planetary Mechanism.

In the drawings of the first six figures, the most important elements are denoted as follows:

- 00: Frame
- 10: Central Carrier
- 20: Planetary Carrier
- 23: Planetary Reaction Shaft
- 45: Satellite Shaft
- 67: Planetary Action Shaft
- S1: Spur External Reaction Sun
- I1: Spur Internal Reaction Sun
- S2: Spur Reaction Sun-Planet
- S3: Spur Reaction Satellite-Planet
- B3: Bevel Reaction Satellite-Planet
- S4: Spur Reaction Satellite
- B4: Bevel Reaction Satellite
- S5: Spur Action Satellite
- B5: Bevel Action Satellite
- S6: Spur Action Satellite-Planet
- B6: Bevel Action Satellite-Planet
- S7: Spur Action Sun-Planet
- S8: Spur External Action Sun
- I8: Spur Internal Action Sun

REMARKS the eight gears involved are either spur or bevel, either straight or helical, and finally, either external or internal, unless the type of a gear is stated otherwise, therefore they are characterized by a letter which is either the "S" for a spur gear or the "B" for a bevel gear or the "I" for an internal gear, in addition to this notation, for the element which is coincident with the input or the output of the mechanism, is preceded by an "I/O" marking, while for the other element, which—inversely depending on the role of the just mentioned element—is coincident with the output or the input of the mechanism, is preceded by an "O/I" marking.

Figure 3:
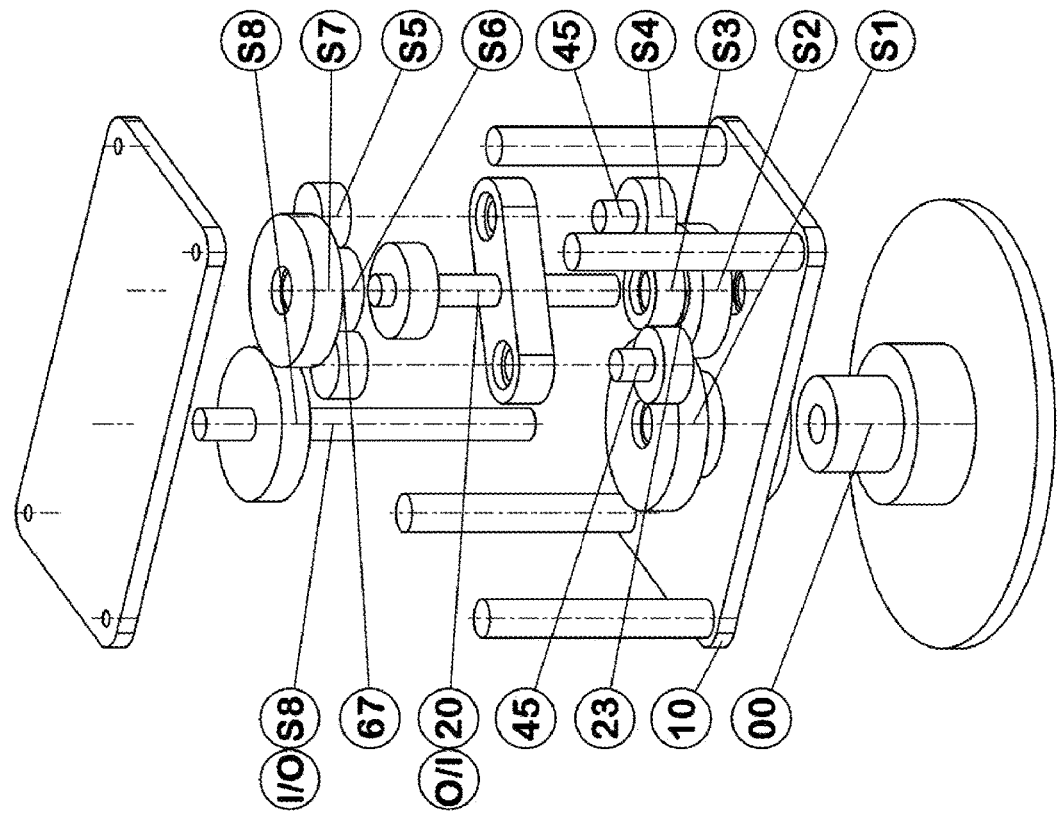
FIG. 03: an exploded oblique view of the same mechanism as in FIGS. 01A, 01B where the planetary carrier has been rotated at a random angle, in order to present clearly the satellites.

FIGS. 01A, 01B and FIGS. 02A, 02B are sufficient for the complete understanding of the structure and the operation of the Compound Planetary Mechanism; however, FIG. 03 and FIG. 04 clarify even more structural details, FIGS. 05A, 05B and FIGS. 06A, 06B give a rather shallow presentation of two more specific implementations, so in these drawings all the elements involved have the notation as in the FIG. 02B, unless their notation is stated otherwise, because the shaft which carries the action sun (S8) does not carry any other gear, in the drawings this shaft is indicated with the same notation S8, for better understanding of all these drawings, where the elements are rigidly connected together, either are depicted as a single element or their cross-hatches are the same in density and angle.

Therefore, the Compound Planetary Mechanism has a frame (00), which conventionally is stationary in space or rigidly connected to a movable or temporarily stationary structure, and a first carrier, named "central carrier" (10), the axis of which is named "central axis", and which is supported on the frame (00) and is able to rotate freely and endlessly about the central axis.

The Compound Planetary Mechanism has, also, a first spur gear, named "reaction sun", being either external (S1) or internal (I1), rigidly connected to the frame (00) coaxially with the central axis and having a teeth number $Z_{S1}$ or $Z_{I1}$, respectively, and a second spur gear, named "action sun", being either external (S8) or internal (I8), supported on the frame (00) coaxially with the central axis and able to rotate freely and endlessly about the central axis, constituting either the input or the output of the Compound Planetary Mechanism and having a teeth number $Z_{S8}$ or $Z_{I8}$, respectively.

The central carrier (10) has a plurality of axes, each of them named "planetary axis", preferably parallel to the central axis and at a distance from the central axis common for all the planetary axes, preferably equally angularly distributed around the central axis.

A second carrier (20) corresponds to each of these planetary axes, named "planetary carrier", which is supported on the central carrier (10) coaxially with its corresponding planetary axis and is able to rotate freely and endlessly about this planetary axis, while each planetary carrier (20) has a plurality of axes, each of them named "satellite axis", preferably parallel to this planetary axis and at a distance from this planetary axis common for all these satellite axes, preferably equally angularly distributed around this planetary axis.

A first shaft (45) corresponds to each of these satellite axes, named "satellite shaft", which is supported on the planetary carrier (20) coaxially with its corresponding satellite axis, is able to rotate freely and endlessly about this satellite axis, and has a third gear, named "reaction satellite", coaxially and rigidly connected to the one end of this satellite shaft (45), being either spur (S4) or bevel (B4) and having a teeth number $Z_{S4}$ or $Z_{B4}$, respectively, and has, also, a fourth gear, named "action satellite", coaxially and rigidly connected to the other end of this satellite shaft (45), being either spur (S5) or bevel (B5) and having a teeth number $Z_{S5}$ or $Z_{B5}$, respectively.

A second shaft (23) corresponds to each of the planetary axes, named "planetary reaction shaft", which is supported on the planetary carrier (20) coaxially with its corresponding planetary axis, is able to rotate freely and endlessly about this planetary axis, and has a fifth spur gear (S2), named "reaction sun-planet", coaxially and rigidly connected to the one end of this planetary reaction shaft (23), cooperating with the reaction sun (S1 or I1) and having a teeth number $Z_{S2}$, and has, also, a sixth gear, named "reaction satellite-planet", coaxially and rigidly connected to the other end of this planetary reaction shaft (23), being either spur (S3) or bevel (B3), cooperating with the reaction satellite (S4 or B4, respectively) and having a teeth number $Z_{S3}$ or $Z_{B3}$, respectively.

A third shaft (67) corresponds, also, to each of the planetary axes, named "planetary action shaft", which is supported on the planetary carrier (20) coaxially with its corresponding planetary axis, is able to rotate freely and endlessly about this planetary axis, and has a seventh spur gear (S7), named "action sun-planet", coaxially and rigidly connected to the one end of this planetary action shaft (67), cooperating with the action sun (S8 or I8) and having a teeth number $Z_{S7}$, and has, also, an eighth gear, named "action satellite-planet", coaxially and rigidly connected to the other end of this planetary action shaft (67), being either spur (S6) or bevel (B6), cooperating with the action satellite (S5 or B5, respectively) and having a teeth number $Z_{S6}$ or $Z_{B6}$, respectively.

Depending on the design of the Compound Planetary Mechanism, in its generalized configuration, either any of the planetary carriers (20) or any of the planetary action shafts (67) constitutes either the output or the input of the Compound Planetary Mechanism—inversely depending on the role of the action sun (S8 or I8)—and is named "eccentric shaft" (20 or 67).

Therefore, the local angular velocity of this eccentric shaft (20 or 67) about its own axis with respect to the central carrier (10) is required to be independent of the angular velocity of the central carrier (10) with respect to the frame (00), while is required, also, to be only dependent on the angular velocity of the action sun (S8 or I8) with respect to the frame (00), and to achieve these requirements the teeth numbers of all the gears involved is necessary to satisfy the aforementioned "Independence Condition".

Figure 6B:
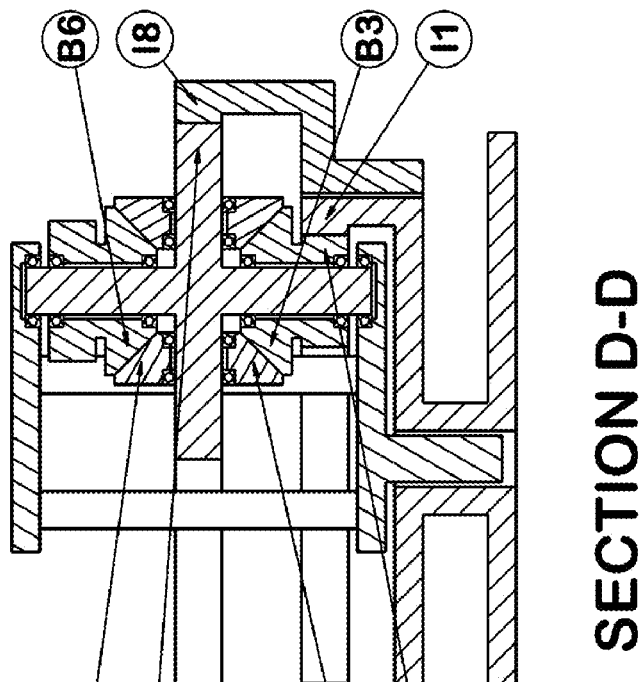
FIG. 06B: the meridian section along line D-D in FIG. 06A of a mechanism with spur and bevel gears, the reaction sun and the action sun of which are internal gears.
Figure 6A:
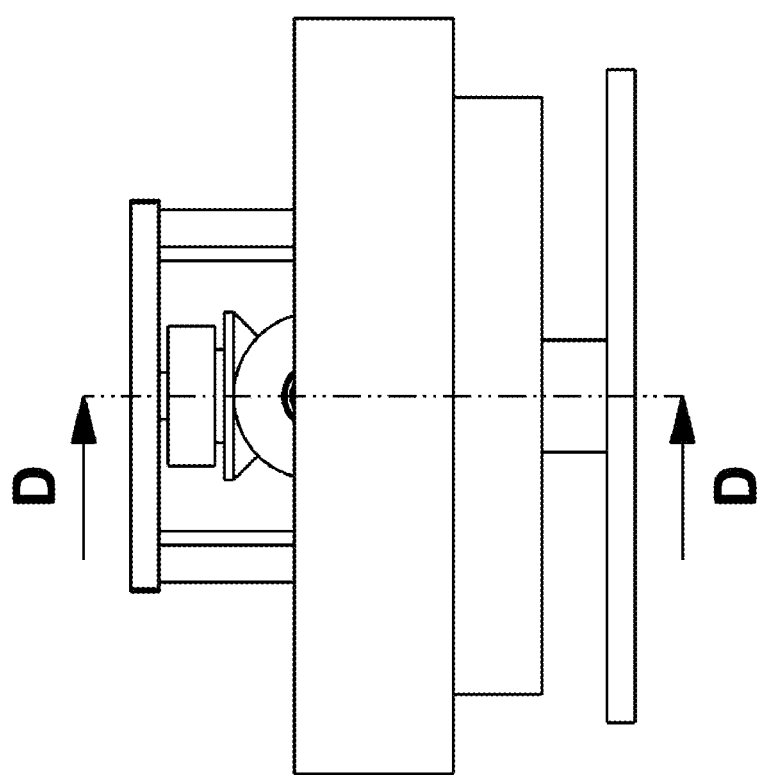
FIG. 06A: a side view.

More specifically, there are the following implementations of the Compound Planetary Mechanism:

with the exclusive use of spur gears, exactly as shown in FIGS. 01A, 01B and FIG. 03, where the only planetary carrier (20) is coincided with the eccentric shaft (20 or 67), while the Independence Condition is:

$Z_{S1}/Z_{S2}*Z_{S3}/Z_{S4}*Z_{S5}/Z_{S6}*Z_{S7}/Z_{S8}=1$, using spur and bevel gears, generally as shown in FIGS. 02A, 02B and FIG. 04, where the only planetary action shaft (67) is coincided with the eccentric shaft (20 or 67), while the Independence Condition, generally, is:

$(Z_{S1}/Z_{S2}*Z_{S7}/Z_{S8}-1)*Z_{B3}/Z_{B4}*Z_{B5}/Z_{B6}=1$, as well as in the case of merging of the two bevel satellites, which are rigidly connected to the satellite shaft (45), into a single bevel gear, exactly as shown in FIGS. 02A, 02B and FIG. 04, where the Independence Condition is simplified as follows:

$Z_{S1}/Z_{S2}*Z_{S7}/Z_{S8}=2$, using spur and bevel gears, while the reaction sun (I1) is an internal gear and all the other gears are external, where the only planetary carrier (20) is coincided with the eccentric shaft (20 or 67) and the bevel satellites are merged into a single bevel gear, exactly as shown in FIGS. 05A, 05B, while the Independence Condition is:

$Z_{I1}/Z_{S2}*Z_{S7}/Z_{I8}=1$, using spur and bevel gears, while the reaction sun (I1) and the action sun (I8) are internal gears and all the other gears are external, where the only planetary action shaft (67) is coincided with the eccentric shaft (20 or 67) and the bevel satellites, also, are merged into a single bevel gear, exactly as shown in FIGS. 06A, 06B while the Independence Condition is:

$Z_{I1}/Z_{S2}*Z_{S7}/Z_{I8}=2$.

Note: in all the above cases the Independence Condition is elegant and simple; however, special care should be taken so that the individual local transmission ratios do not lead to indeterminacy of the angular position of any moving part involved.

Thereafter, some more specialized applications of the Compound Planetary Mechanism are presented:

An interesting case, as it is already referred above, is its application to a horizontal axis wind turbine, so that the power generated on the horizontal propeller shaft is transmitted from the endlessly rotating nacelle, which, in fact, is the carrier (10) of the Compound Planetary Mechanism, on which it rests, to the stationary tower, which, in fact also, is the frame (00) of the Compound Planetary Mechanism, where this transmission is completely—kinematically and dynamically—independent of the endless rotation of the nacelle (10), a motion which is required so that the plane of rotation of the propellers takes the best possible orientation for the optimal exploitation of the available wind energy.

Figure 7B:
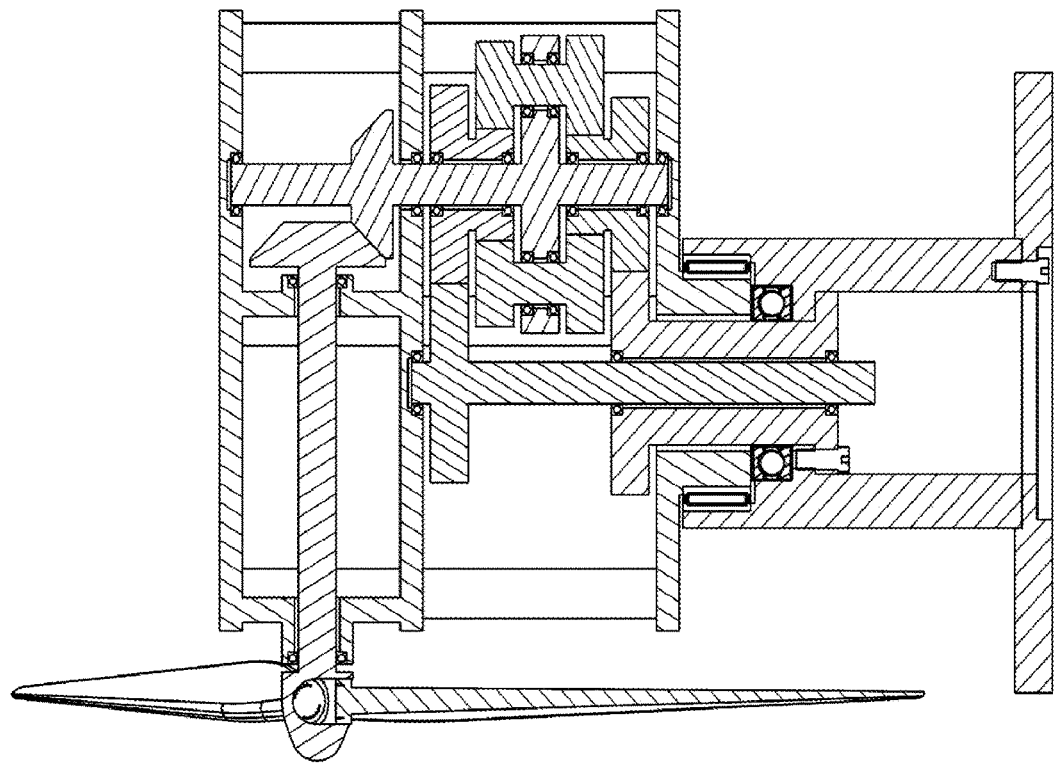
FIG. 07B: a meridian section of an application of the mechanism, using spur gears only for the main mechanism, to a wind turbine, which clarify the structural details of this application.
Figure 7A:
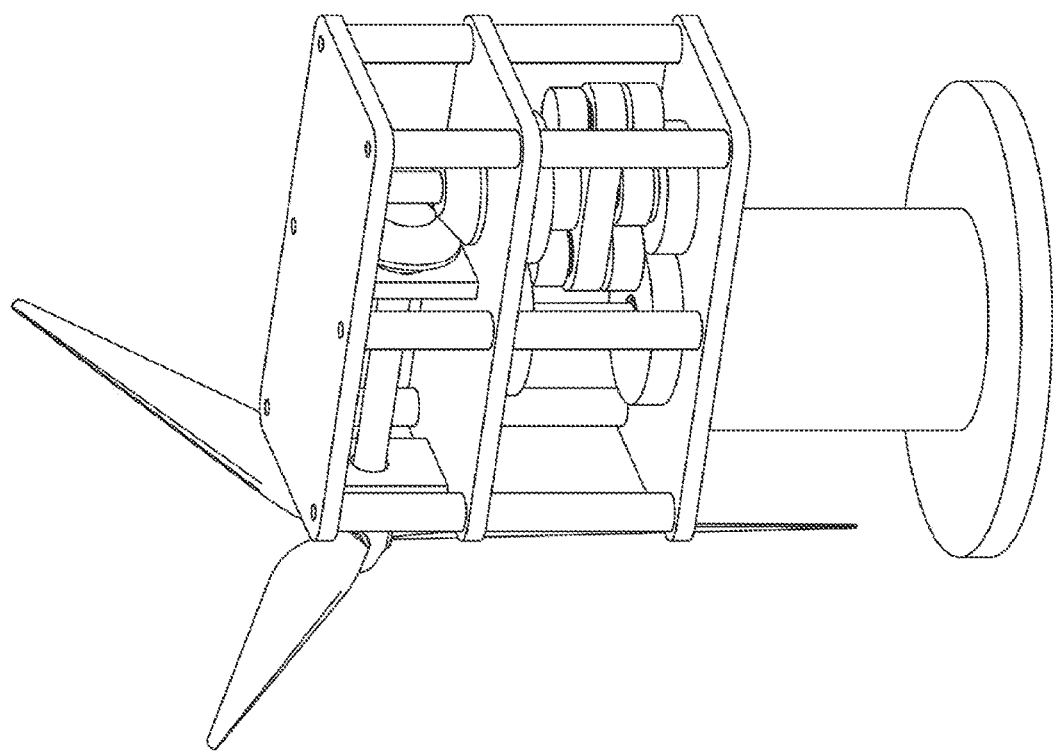
FIG. 07A: an oblique view.
Figure 8B:
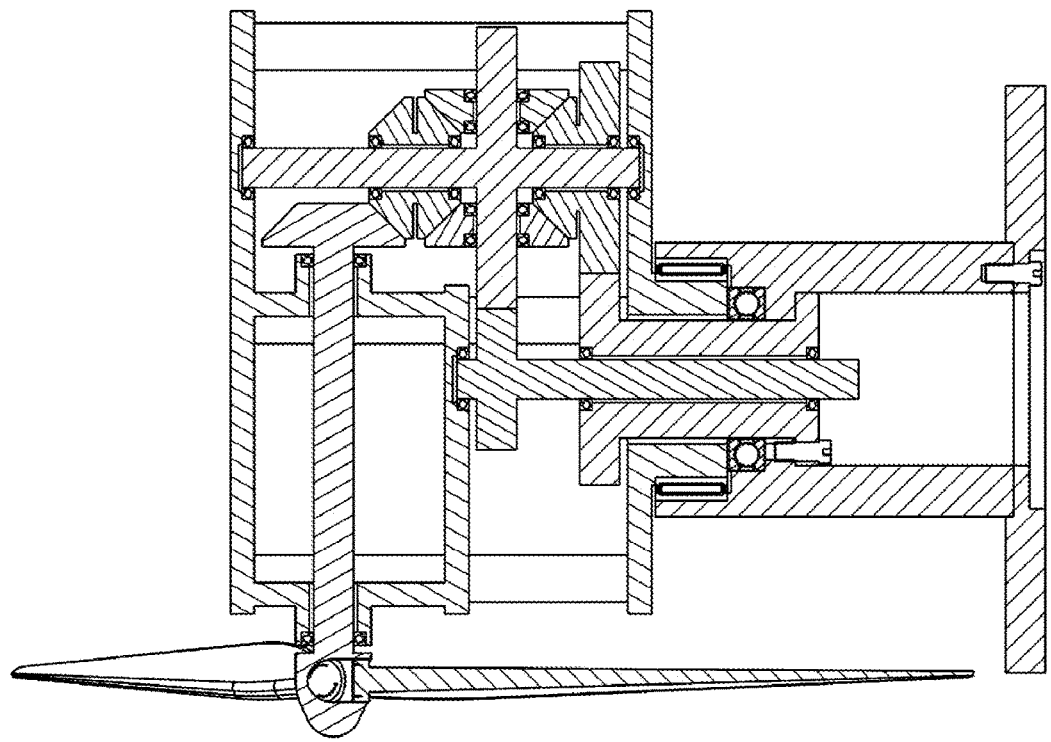
FIG. 08B: a meridian section of an application of the mechanism, using spur and bevel gears for the main mechanism, to a wind turbine, which clarify, also, the structural details of this application.
Figure 8A:
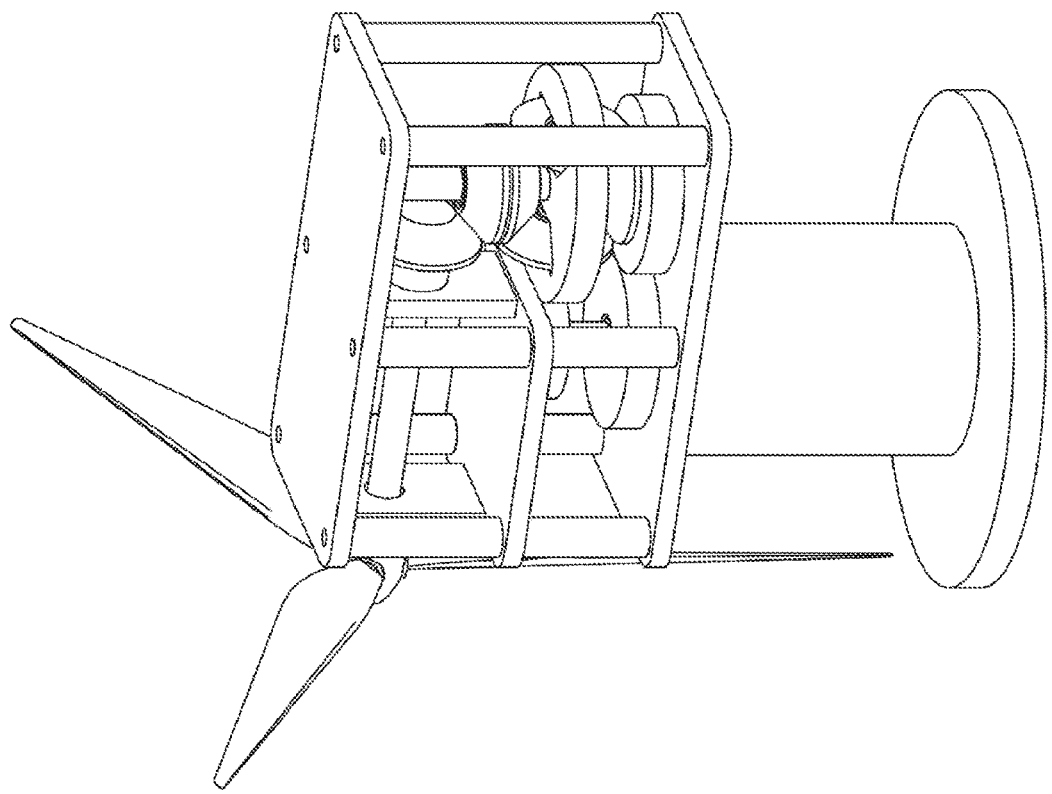
FIG. 08A: an oblique view.

More specifically, these are two representative implementations:

with the exclusive use of spur gears for the Compound Planetary Mechanism only, as shown in FIGS. 07A, 07B, where also is shown the way in which the horizontal propeller shaft transmits power to the only planetary carrier (20) of the Compound Planetary Mechanism, through bevel gears, using spur and bevel gears, as shown in FIGS. 08A, 08B, where also is shown, again, the way in which the horizontal propeller shaft transmits power to the only planetary action shaft (67) of the Compound Planetary Mechanism, also through bevel gears.

In all the above cases, if the electric generator and possibly the gearbox of the wind turbine are located on the base of its tower or near it, the shaft which has the duty to transmit power from the action sun (S8 or I8), which is located on the top of the tower of the wind turbine, to its base or near it, can be an elongate space frame structure of sufficient strength and torsional stiffness, supported with bearing units in specific locations along the longitudinal axis of the tower, which can also be used as a ladder for accessing the top of the wind turbine for inspection and maintenance purposes—after its secure immobilization, of course—at regular intervals.

Note: such a total transmission ratio must be achieved, so that the shaft, which undertakes to transmit power from the top of the tower of the wind turbine to its base or near it, rotates at a frequency sufficiently far from its natural frequency.

Figure 9C:
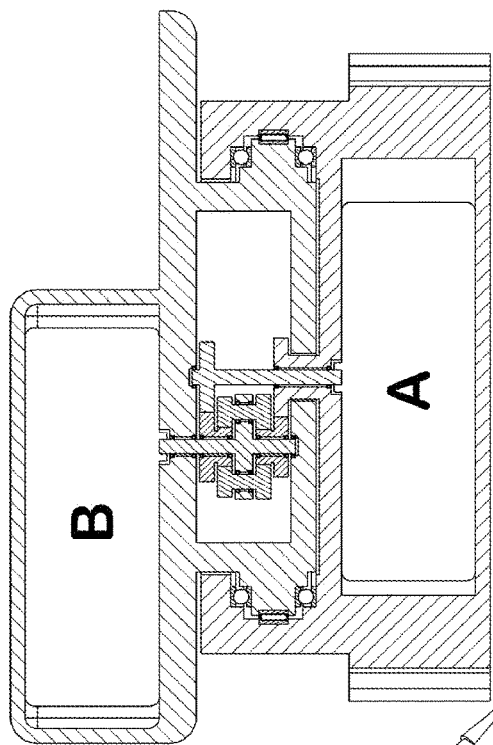
FIG. 09A: an oblique view.
FIG. 09B: a meridian section of an excavator, as well as FIG. 09C: a close-up of the same meridian section, which can be, also, the meridian section of a battle tank, or even of a building such as a lighthouse or a rotating tower.
Figure 9A:
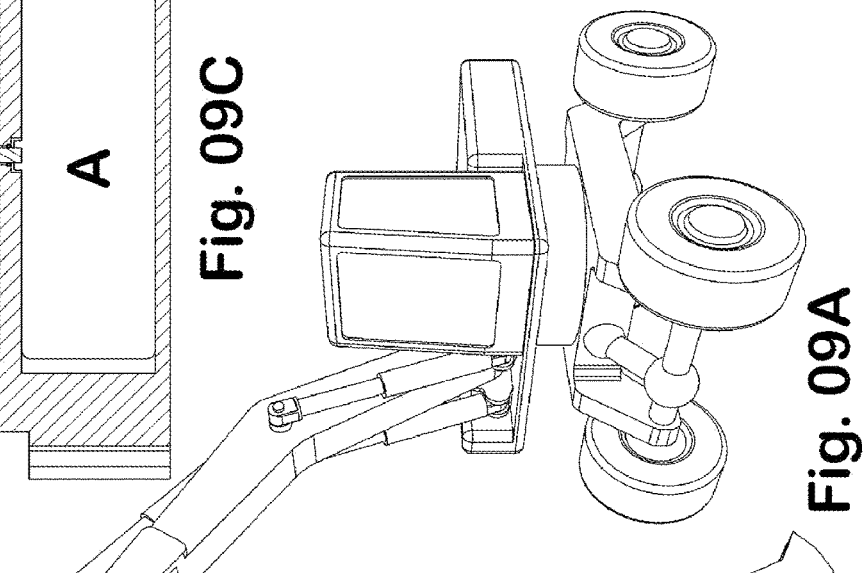
Figure 9B:
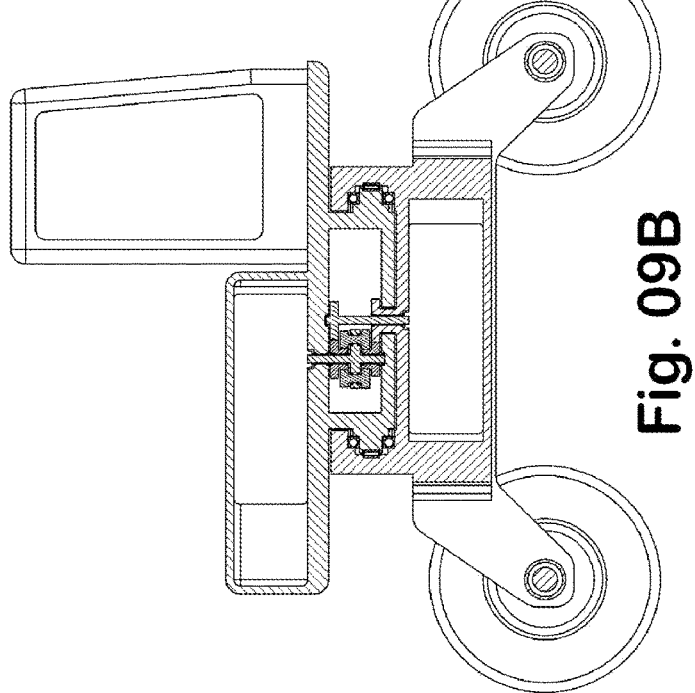

An application, also, of the Compound Planetary Mechanism, as generally shown in FIGS. 09A, 09B, is to a construction, which is either a building or any other structure with its base stationary with respect to the ground, such as a lighthouse or a rotating tower (the "OTE Tower" of the Thessaloniki International Fair, for example), or movable, such as a large excavator or a battle tank, the structure of which has, at least, two compartments with the possibility of endless angular motion of each compartment with respect to its neighboring one, where the one compartment of the structure, such as the ground or the chassis in these examples, is coincided with the frame (00) of the Compound Planetary Mechanism, while the next compartment, such as the tower or the turret in these examples, is coincided with the endlessly rotating central carrier (10) of the Compound Planetary Mechanism, with the final result of transmitting endless rotation from a driving shaft on the one compartment to a driven shaft on the next compartment, independently of the endless relative rotation between these compartments; of course this procedure can be repeated from the one compartment to its neighboring one, as many times as it is required by the number of the compartments. More specifically, for an excavator there is the capability of carrying the engine and the hydraulic equipment in place B, as shown in FIG. 09C, as currently happens, and in place A, as shown, also, in FIG. 09C, can be the mechanical differential and the rest of the purely mechanical power-train in order to transmit power to the wheels, or the capability of carrying the engine—preferably a boxer one—in place A and the hydraulic equipment only in place B, keeping the gravity center in the lower possible level, thus rendering the use of this excavator more safe and effective.

Figure 10A:
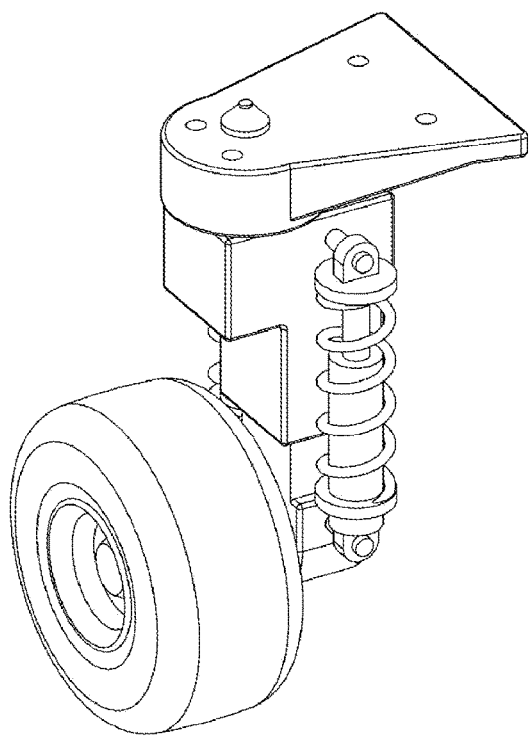
FIG. 10A: an oblique view.
Figure 10B:
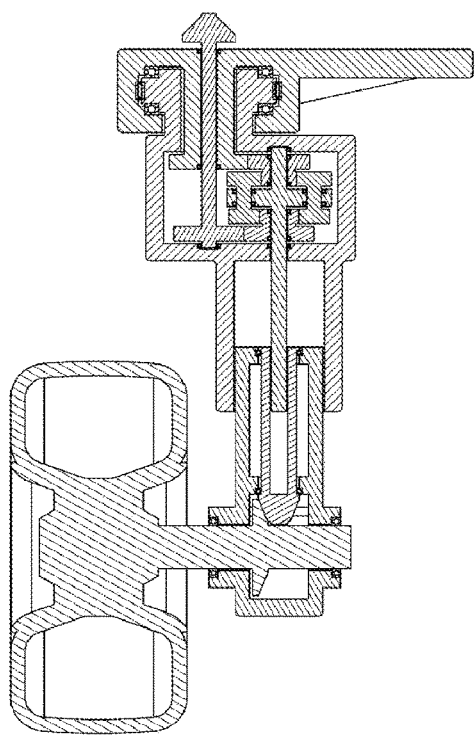
FIG. 10B: a meridian section of a steering bracket unit.
Figure 10C:
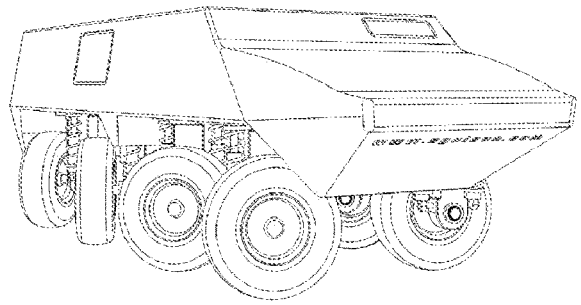
FIG. 10C: an application to a purely military vehicle 8×8×8.
Figure 10D:
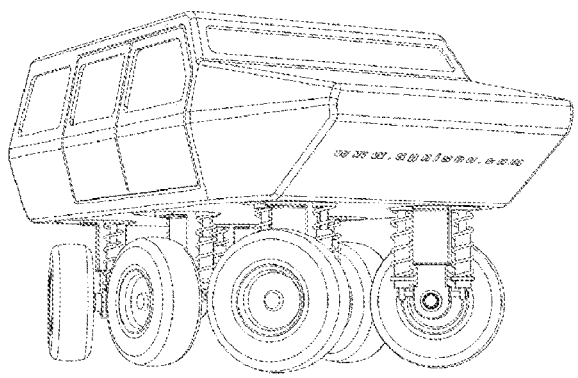
FIG. 10D: an application to an extreme sport utility vehicle 6×6×6.
Figure 10E:
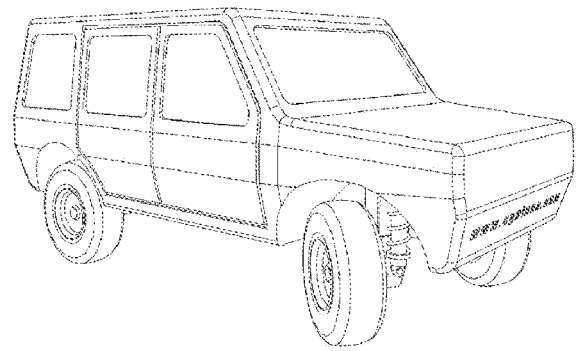
FIGS. 10E and 10F: application to a classic passenger car 4×2×2 with a normal steering angle and an extraordinary one, respectively.
Figure 10F:
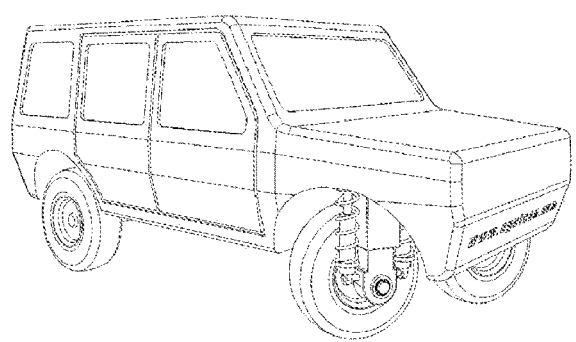
Figure 11A:
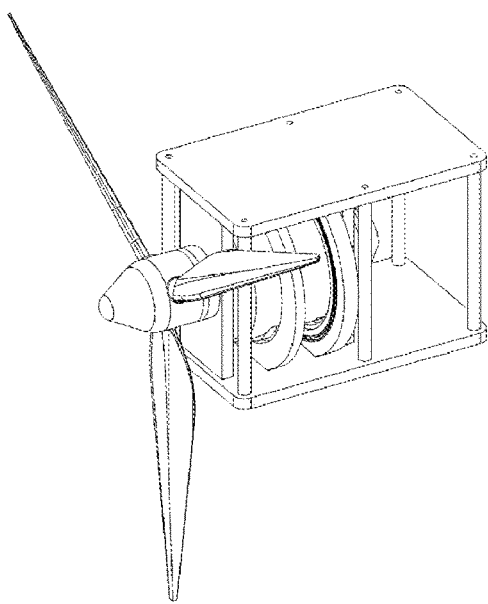
FIG. 11A: an oblique view
Figure 11B:
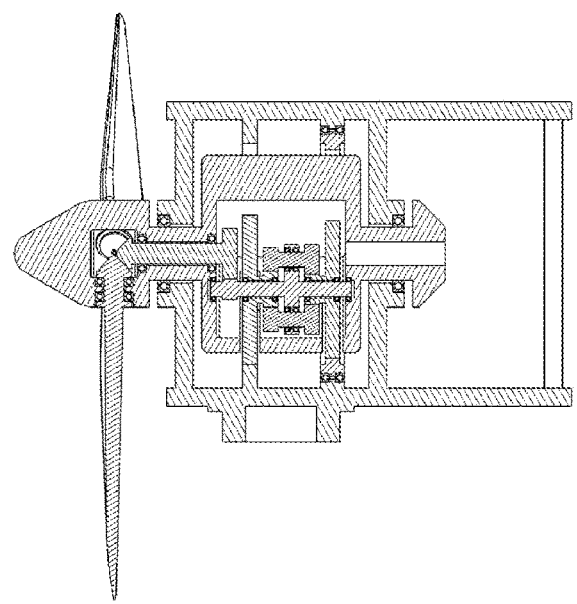
FIG. 11B: a meridian section of the start of the power-train for a wind turbine or of the end of the power-train for a propeller-driven aircraft.
Figure 11C:
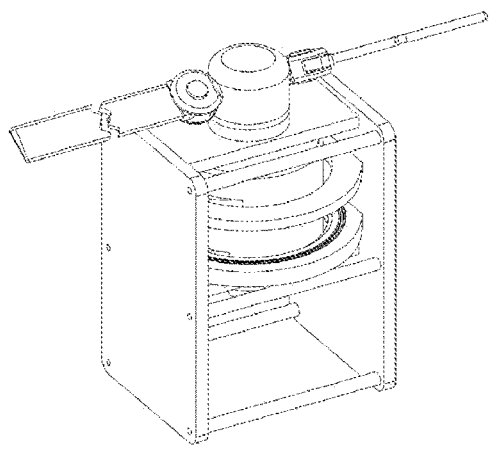
FIG. 11C: an oblique view
Figure 11D:
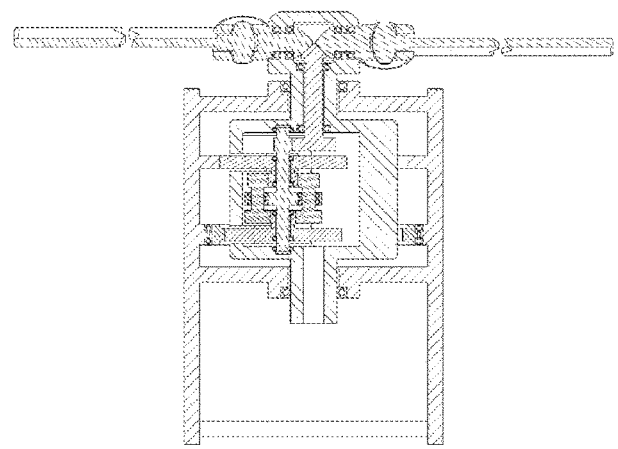
FIG. 11D: a meridian section of the end of the power-train for a helicopter.
Figure 11E:
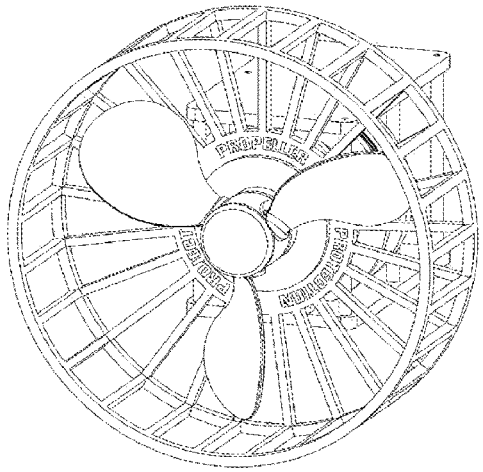
FIG. 11E: an oblique view and FIG. 11F a meridian section of the end of the power-train for a propeller-driven craft; all these drawings refer to a propeller pitch adjustment mechanism.
Figure 11F:
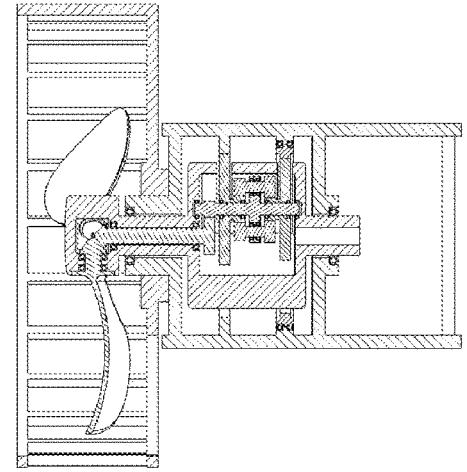

Another application of the Compound Planetary Mechanism, as shown in FIGS. 10A, 10B, is to a steering bracket which carries the drive wheel of a vehicle, where this steering bracket is supported on the chassis of the vehicle and rotates about an axis preferably perpendicular to the axis of rotation of the wheel, for the purpose of steering the vehicle, so the transmission of power from the chassis which is coincided with the frame (00) of the Compound Planetary Mechanism to the endlessly rotating drive wheel of this vehicle is achieved, independently of the rotation of the steering bracket, which is coincided with the central carrier (10) of the Compound Planetary Mechanism; this steering rotation is usually finite, while, thanks to this configuration, can be also endless, rendering in this way the vehicle really holonomic.

As shown in FIG. 10B, the output of the Compound Planetary Mechanism, which is the planetary carrier (20) of the FIG. 01B, is connected to a coaxial splined shaft, thus constituting a telescopic transmission shaft of variable length, within a steering bracket frame of variable length as well, giving in this way one more degree of freedom to the wheel, while, with similar mechanical engineering tricks, the wheel can gain all the necessary degrees of freedom, so that the Compound Planetary Mechanism can supersede the ball-bearing constant velocity joint in many applications.

Finally, one more application of the Compound Planetary Mechanism, as shown in FIGS. 11A-11F, is its use for the adjustment of the propeller pitch for a propeller-driven aircraft, a helicopter, a propeller-driven craft, but also a wind turbine, where the propeller hub is coincided with the endlessly rotating carrier (10) of the Compound Planetary Mechanism, and the aircraft frame, the helicopter frame, the craft frame, the rotating nacelle of the wind turbine in case of a horizontal axis type or the stationary tower of the wind turbine in any other case, is coincided with the frame (00) of the Compound Planetary Mechanism, while in this application the rotation for adjusting the propeller pitch may be even endless; for this application the configuration of the FIGS. 06A, 06B has been used, with the two internal gears, since it results in the most compact and robust overall configuration.

The basic configuration of the present invention includes only five moving parts, namely the action sun, the planetary action shaft, the satellite shaft, the planetary reaction shaft and the planetary carrier, with the addition, of course, of a sixth moving part, which is the central carrier; this central carrier, of course, already exists since the very beginning of the design and in fact is the moving part with the—in some way—undesired motion.

The operation of the basic configuration of the present invention, also, is based on the cooperation of only four pairs of cooperating gears, while all these gears can be and moreover is preferable to be standard ones.

Even more, there is no any other element which must be specialized; therefore the result is the simplest and most cost-effective possible construction and maintenance, while, at the same time, due to the least possible number of moving parts, the highest possible degree of efficiency is achieved, leading to the most productive possible operation.

It is also important that, by the design of the present invention per se, the most balanced arrangement of the diameters of the gears can be achieved, resulting in the avoidance of the problematic pinion, which is the weakest link in any power-train.

Moreover, taking into account some specific applications of the present invention, the advantages become more obvious and understandable:

relocation of the vast majority of the operating elements of a wind turbine, from its rotating nacelle to its stationary tower, resulting in the drastic lightening of the nacelle and the drastic, also, reducing of the construction and maintenance costs, in addition, combining the concept of the application PCT/GR2021/000012 with the one of the present invention, the result is a configuration with a total transmission ratio as high as it is required by the design of the wind turbine as a whole, thus this configuration comprises a highly effective speed increaser, taking low speed from the propeller shaft and providing high speed to the electric generator, superseding the currently used speed increaser, and the achievement of all these is performed by the insertion of five new moving parts only, transmission of the electric power via the simplest possible way, avoiding an unnecessarily complex configuration, with low performance and short-lived elements, such as the electric slip rings, achievement of purely endless rotation of the turret of a large excavator or a battle tank, with respect to their chassis, while with the existing technology either the rotation is finite and with a significantly shorter angular path than a full revolution or it is much more expensive in construction and maintenance if an endless rotation is available but with a special sealing for rotation of the hydraulic piping, lowering of the level of the gravity center of the excavator or the battle tank as much as possible, thus rendering the use of the excavator or the battle tank more effective and safe, designing of an all-wheel drive and all-wheel steering vehicle, a really holonomic one, as the steering brackets can be rotated, for steering, in an absolutely endless way, designing, also, of a vehicle with extremely high clearance from the ground, for special use—for firefighting in rugged and jungly terrain, for instance—as the height of each steering bracket unit can be as great as it is required, achievement of the capability of transmitting of a huge amount of power via wheels which propel and steer the vehicle at the same time, even in a classic front-wheel drive car, with a normal steering angle amplitude, because this transmission is performed via robust gears instead of delicate balls of the ball-bearing constant velocity joint, a fact that can render this application of the present invention the new and promising proposal for the propulsion of a vehicle of any type, especially a military one or even a supercar, achievement of the most elegant, compact and robust configuration, even in the case of the propeller pitch adjustment, although the currently used mechanisms are effective because of the need of finite operating stroke, rotational or linear, achievement of the capability of even endless rotation for the adjustment of the propeller pitch, with whatever this implies.

In conclusion, these are a number of merits of the present invention which are easily contrasted as advantages over a competition, which in fact does not exist, or, in the few and individual cases in which it does exist, is rather moderate.

The invention claimed is:
1. A compound planetary mechanism comprising:
a frame;

a first carrier supported on the frame and configured to rotate freely and endlessly about a central axis of rotation of the first carrier;

a first gear comprising either an external gear or an internal gear;

a second gear supported on the frame and configured to rotate freely and endlessly about the central axis of rotation, the second gear comprising either an external or an internal gear; and at least one planetary mechanism comprising:

a second carrier supported on the first carrier and configured to rotate freely and endlessly about a planetary axis and disposed substantially parallel to the central axis of rotation and at a distance from the central axis of rotation, wherein the second carrier comprises at least:

a first shaft supported on the second carrier and configured to rotate freely and endlessly about a satellite axis which forms an angle between zero and ninety degrees with the planetary axis;

a third gear rigidly connected to a first end of the first shaft coaxially with the satellite axis; and a fourth gear rigidly connected to a second end of the first shaft coaxially with the satellite axis;

a second shaft supported on the second carrier and configured to rotate freely and endlessly about the planetary axis;

a fifth gear rigidly connected to a first end of the second shaft coaxially with the planetary axis and cooperating with the first gear;

a sixth gear rigidly connected to a second end of the second shaft coaxially with the planetary axis and cooperating with the third gear;

a third shaft supported on the second carrier and configured to rotate freely and endlessly about the planetary axis;

a seventh gear rigidly connected to a first end of the third shaft coaxially with the planetary axis and cooperating with the fourth gear; and an eighth gear cooperating with the second gear and rigidly connected coaxially with the planetary axis either to a second end of the third shaft or to the second carrier.

2. The compound planetary mechanism of claim 1, wherein:

the first gear has a teeth number $Z_{S1}$ or $Z_{I1}$,
the second gear a teeth number $Z_{S8}$ or $Z_{I8}$,
the third gear a teeth number $Z_{S4}$ or $Z_{B4}$,
the fourth gear a teeth number $Z_{S8}$ or $Z_{B5}$,
the fifth gear a teeth number $Z_{S2}$,
the sixth gear a teeth number $Z_{S3}$ or $Z_{B3}$,
the seventh gear a teeth number $Z_{S6}$ or $Z_{B6}$, and
the eighth gear a teeth number $Z_{S7}$;

and wherein the relation that applies to the eight gears is:

$K*L=1$ or $(1-K)*L-1$, where:

$K=Z_{S1}/Z_{S2}*Z_{S7}/Z_{S8}$ or $K=-Z_{I1}/Z_{S2}*Z_{S7}/Z_{S8}$ or
$K=-Z_{S1}/Z_{S2}*Z_{S7}/Z_{I8}$ or $K=Z_{I1}/Z_{S2}*Z_{S7}/Z_{I8}$ and $L=Z_{S3}/Z_{S4}*Z_{S5}/Z_{S6}$ or $L=-Z_{B3}/Z_{B4}*Z_{B5}/Z_{B6}$, such that the compound planetary mechanism transmits endless rotation from the second gear, on the frame, to either the second carrier or the third shaft, on the first carrier, or vice versa, independently of the endless rotation of the first carrier with respect to the frame.

3. The compound planetary mechanism of claim 1, wherein two or more of the first to eighth gears is a spur gear or a bevel gear.

4. The compound planetary mechanism of claim 1, wherein the first gear is rigidly connected to the frame.

5. The compound planetary mechanism of claim 1, wherein the first gear is supported on the frame and is configured to rotate freely and endlessly about the central axis.

6. The compound planetary mechanism of claim 1, wherein the satellite axis is parallel to the planetary axis and at a distance from the planetary axis.

7. The compound planetary mechanism of claim 1, wherein the satellite axis is perpendicular to the planetary axis.

8. A wind turbine comprising a stationary tower, a rotational nacelle, a propeller shaft, and the compound planetary mechanism of claim 1, wherein the stationary tower and the nacelle correspond to the frame and the first carrier, respectively, of the compound planetary mechanism.

9. A horizontal axis wind turbine comprising the compound planetary mechanism according to claim 1, wherein the frame is a stationary tower of the wind turbine and the first carrier is a rotational nacelle of the wind turbine, wherein either the second carrier or the third shaft is the input of the compound planetary mechanism and is configured to be connected to a propeller shaft mounted on the rotational nacelle of the wind turbine, and wherein the second gear is the output of the compound planetary mechanism and is configured to be connected to a shaft of an electric generator which is located on and stationary with respect to the stationary tower of the wind turbine, such that an endless rotation is transmitted from the propeller shaft to the shaft of the electric generator independently of the endless rotation of the nacelle with respect to the stationary tower.

10. A wind turbine according to claim 9, wherein the electric generator is located proximately on the base of the stationary tower and an endless rotation is transmitted from the second gear of the compound planetary mechanism located on the top of the stationary tower to the shaft of the electric generator through/via an elongate space frame structure of sufficient strength and torsional rigidity supported by bearing units at specific locations along the longitudinal axis of the stationary tower, and wherein the elongate space frame structure is configured for use also as a ladder for accessing the top of the stationary tower.

11. A stationary or movable structure, comprising the compound planetary mechanism of claim 1 and at least two neighboring compartments configured for endless rotation of each compartment with respect to its neighboring one, wherein the frame of the compound planetary mechanism is one of the at least two compartments and the first carrier of the compound planetary mechanism is its neighboring of the at least two compartments, such that an endless rotation is transmitted from a driving shaft on one of the at least two compartments to a driven shaft on its neighboring of the at least two compartments independently of the endless relative rotation between the at least two compartments.

12. In a steering mechanism of a vehicle having a rotational steering bracket configured to carry a drive wheel of the vehicle and supported on the chassis of the vehicle for undergoing rotation about an axis substantially perpendicular to the axis of rotation of the vehicle drive wheel for steering the vehicle, a compound planetary mechanism according to claim 1, wherein the vehicle chassis corresponds to the frame of the compound planetary mechanism and the rotational steering bracket corresponds to the first carrier of the compound planetary mechanism, such that an endless rotation is transmitted from a driving shaft on the vehicle chassis to a driven shaft on the rotational steering bracket, wherein the driven shaft is configured to drive the vehicle drive wheel, independently of the steering rotation, finite or endless, of the rotational steering bracket with respect to the vehicle chassis.

13. In an apparatus having a frame and a rotational propeller hub carrying propeller blades and mounted on the frame for undergoing rotation relative to the frame, a compound planetary mechanism according to claim 1, wherein the frame of the apparatus corresponds to the frame of the compound planetary mechanism and the rotational propeller hub corresponds to the first carrier of the compound planetary mechanism, such that a rotation, finite or endless, is transmitted from a driving shaft on the frame to a driven shaft on the rotational propeller hub, independently of the endless rotation of the rotational propeller hub with respect to the frame, mainly for adjusting the pitch of the propeller blades carried by the rotational propeller hub.

14. The apparatus of claim 13, wherein the apparatus is a propeller-driven craft.

15. The apparatus of claim 13, wherein the apparatus is a propeller-driven aircraft.

16. The apparatus of claim 13, wherein the apparatus is a helicopter.

17. The apparatus of claim 13, wherein the apparatus is a horizontal axis wind turbine, and wherein the frame corresponds to a rotational nacelle of the wind turbine.

18. The apparatus of claim 13, wherein the apparatus is a vertical axis wind turbine, and wherein the frame corresponds to a stationary tower of the wind turbine.

* * * * *